United States Patent
Baldwin et al.

(10) Patent No.: US 9,594,890 B2
(45) Date of Patent: Mar. 14, 2017

(54) IDENTITY-BASED CONTENT ACCESS CONTROL

(71) Applicant: INTEL CORPORATION, Santa Clara, CA (US)

(72) Inventors: James A. Baldwin, Palo Alto, CA (US); Suri B. Medapati, San Jose, CA (US); Yoko Sannomiya, San Jose, CA (US); Oleg S. Varshavsky, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/037,151

(22) Filed: Sep. 25, 2013

(65) Prior Publication Data

US 2015/0089668 A1  Mar. 26, 2015

(51) Int. Cl.
*G06F 7/04* (2006.01)
*G06F 21/32* (2013.01)
*G06F 21/10* (2013.01)
*H04L 29/08* (2006.01)

(52) U.S. Cl.
CPC ............ *G06F 21/32* (2013.01); *G06F 21/10* (2013.01); *H04L 67/18* (2013.01); *G06F 2221/0773* (2013.01); *G06F 2221/2149* (2013.01)

(58) Field of Classification Search
CPC ........ H04L 63/10; H04L 67/18; G06F 21/32; G06F 21/10; G06F 2221/0773; G06F 2221/2149
USPC ........................................... 726/28
See application file for complete search history.

(56) References Cited

U.S. PATENT DOCUMENTS

| | | | |
|---|---|---|---|
| 7,158,776 B1 * | 1/2007 | Estes et al. | 455/411 |
| 8,321,684 B2 * | 11/2012 | Mumm et al. | 713/186 |
| 8,411,909 B1 * | 4/2013 | Zhao et al. | 382/116 |
| 8,428,970 B1 * | 4/2013 | Fiferlick | 705/3 |
| 8,457,367 B1 * | 6/2013 | Sipe et al. | 382/118 |
| 8,711,845 B2 * | 4/2014 | Miyata | 370/352 |
| 8,902,045 B1 * | 12/2014 | Linn et al. | 340/5.83 |
| 2002/0170064 A1 * | 11/2002 | Monroe et al. | 725/105 |
| 2004/0243514 A1 * | 12/2004 | Wankmueller | 705/40 |
| 2006/0173792 A1 * | 8/2006 | Glass | 705/75 |
| 2007/0033607 A1 * | 2/2007 | Bryan | H04H 60/27 725/10 |
| 2007/0211921 A1 * | 9/2007 | Popp et al. | 382/115 |
| 2008/0091425 A1 * | 4/2008 | Kane | 704/246 |

(Continued)

*Primary Examiner* — Mohammad W Reza
(74) *Attorney, Agent, or Firm* — Schwabe, Williamson & Wyatt, P.C.

(57) ABSTRACT

In embodiments, apparatuses, methods and storage media are described that are associated with performing identity-based access control for content. A content consumption device may be configured to control access to presented content based on identities of one or more content consumers that are physically proximate to the device. The content consumption device may be configured to perform facial and/or voice recognition on one or more content consumers to determine an identity for the one or more content consumers. The content consumption device may be configured to determine access permissions for the identified content consumers. At various times, access to a piece of content may change based on who is physically proximate to the content consumption device. Other embodiments may be described and claimed.

25 Claims, 9 Drawing Sheets

(56) References Cited

U.S. PATENT DOCUMENTS

| | | | |
|---|---|---|---|
| 2008/0271791 A1* | 11/2008 | Leemhuis | G05D 7/0133 137/500 |
| 2010/0115592 A1* | 5/2010 | Belz | G06F 21/10 726/5 |
| 2010/0131279 A1* | 5/2010 | Pilz | 704/273 |
| 2010/0165981 A1* | 7/2010 | Kuppuswamy et al. | 370/352 |
| 2010/0251336 A1* | 9/2010 | Allen et al. | 726/4 |
| 2012/0245941 A1* | 9/2012 | Cheyer | 704/246 |
| 2014/0013422 A1* | 1/2014 | Janus et al. | 726/19 |

\* cited by examiner

IDENTITY-BASED CONTENT ACCESS CONTROL

TECHNICAL FIELD

The present disclosure relates to the field of data processing, in particular, to apparatuses, methods and systems associated with presentation of content.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Modern electronic device provide facilities for presenting a wide variety of content, including video and/or audio content. However, not all content is equally appropriate for all content consumers. For example, content may include violent, sexual, drug-related, or political themes that may be deemed inappropriate for certain content consumers. For example, some content may be deemed inappropriate for consumers of particular ages.

However, it is often difficult to effectively control access to content. Children may attempt to consume inappropriate content when parents are not present, for example. In another example, when appropriate content consumers are consuming content, such as when adults are watching an R-rated movie, children may inadvertently enter the room where the content is being consumed. In some cases, even if the content is paused or stopped quickly, inappropriate content may be viewed or heard by a child.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
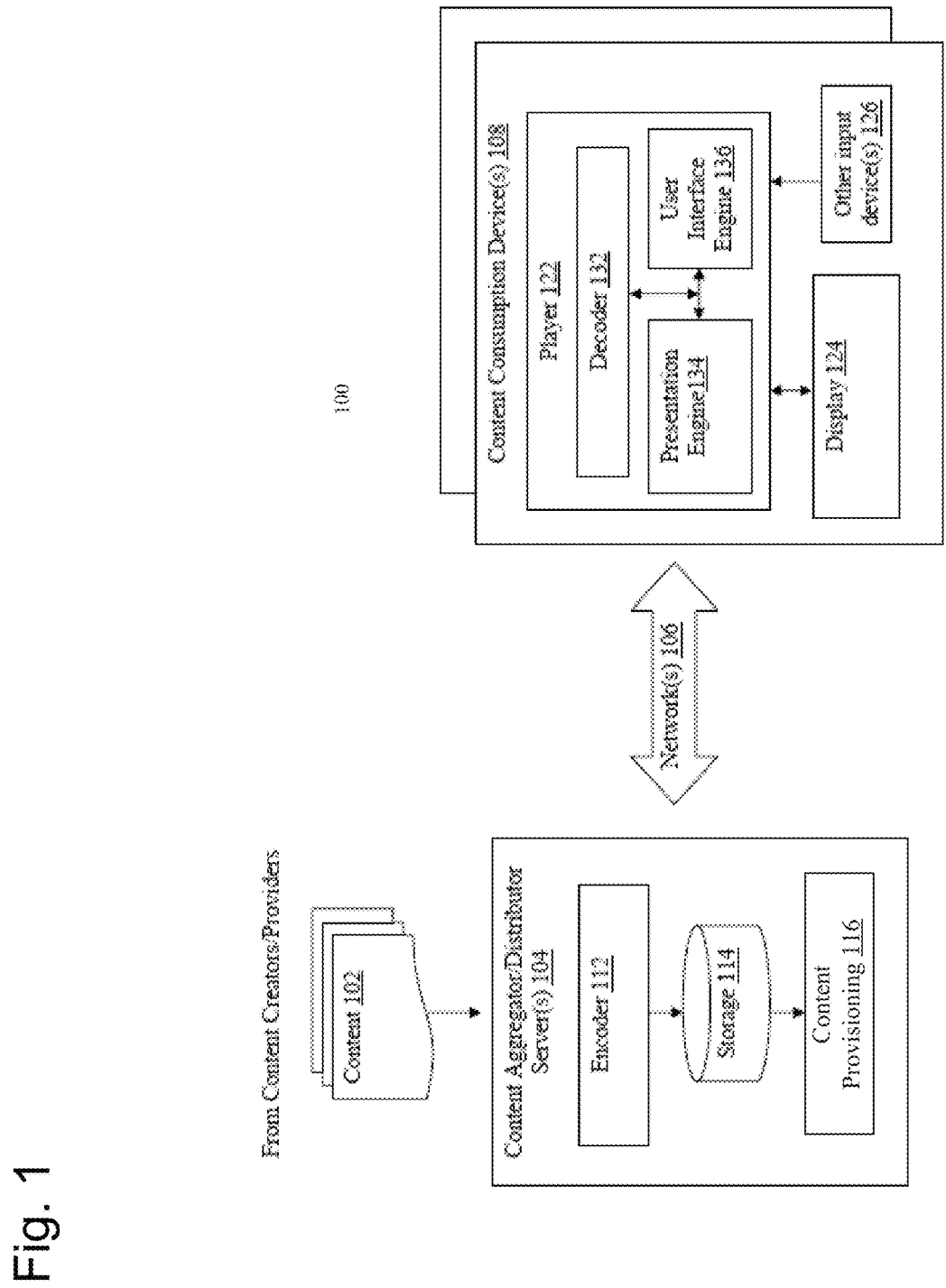
FIG. 1 is a block diagram illustrating an example arrangement for content distribution and consumption, in accordance with various embodiments.

Embodiments described herein are directed to, for example, methods, computer-readable media, and apparatuses associated with performing identity-based access control for content. In various embodiments, content, such as video and/or audio content, may be available for presentation by a content consumption device. In various embodiments, the content consumption device may be configured to control access to the content based on identities of one or more content consumers that are physically proximate to the device. For example, the content consumption device may be configured to perform facial and/or voice recognition on one or more content consumers to determine an identity for the one or more content consumers. In various embodiments, the content consumption device may be configured to determine, for one or more identified content consumers, one or more access permissions. In various embodiments, access to a piece of content may be controlled based on these access permissions. In various embodiments, access may be controlled based on a comparison of the access permissions to metadata describing the piece of content.

In various embodiments, such determination of identity may occur on a repeated fashion, such as when there is a change persons physically proximate to the content consumption device. Thus, at various times, access to a piece of content may change based on who is physically proximate to the content consumption device. By performing such repeated identification, the content consumption device may be configured to facilitate a more active and robust content access control than in other systems/techniques. For example, if adults are watching a movie unsuitable for children in a room and a child walks in the room the content consumption device may identify the child, determine that the child is not permitted to watch the movie, and pause or stop the movie while the child is present. In various embodiments, the content consumption device may allow an adult (or other authorized party) to override the access control, such as with a pass phrase. Other embodiments may be described and claimed.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an arrangement 100 for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106. In various embodiments, camera adjustment techniques described herein may be implemented in association with arrangement 100. In other embodiments, different arrangements, devices, and/or systems maybe used.

In embodiments, as shown, content aggregator/distributor servers 104 may include encoder 112, storage 114 and content provisioning 116, which may be coupled to each other as shown. Encoder 112 may be configured to encode content 102 from various content creators and/or providers 101, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and user input device(s) 126. Player 122 may be configured to receive streamed content, decode and recover the content from the content stream, and present the recovered content on display 124, in response to user selections/inputs from user input device(s) 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a contextual information interface as described herein. The user interface engine 136 may additionally perform interactions relating to identity-based access control for content, as described herein.

While shown as part of a content consumption device 108, display 124 and/or user input device(s) 126 may be stand-alone devices or integrated, for different embodiments of content consumption devices 108. For example, for a television arrangement, display 124 may be a stand alone television set, Liquid Crystal Display (LCD), Plasma and the like, while player 122 may be part of a separate set-top set, and user input device 126 may be a separate remote control (such as described below), gaming controller, keyboard, or another similar device. Similarly, for a desktop computer arrangement, player 122, display 124 and user input device(s) 126 may all be separate stand alone units. On the other hand, for a tablet arrangement, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and user input device(s) 126 may be likewise integrated.

Figure 2:
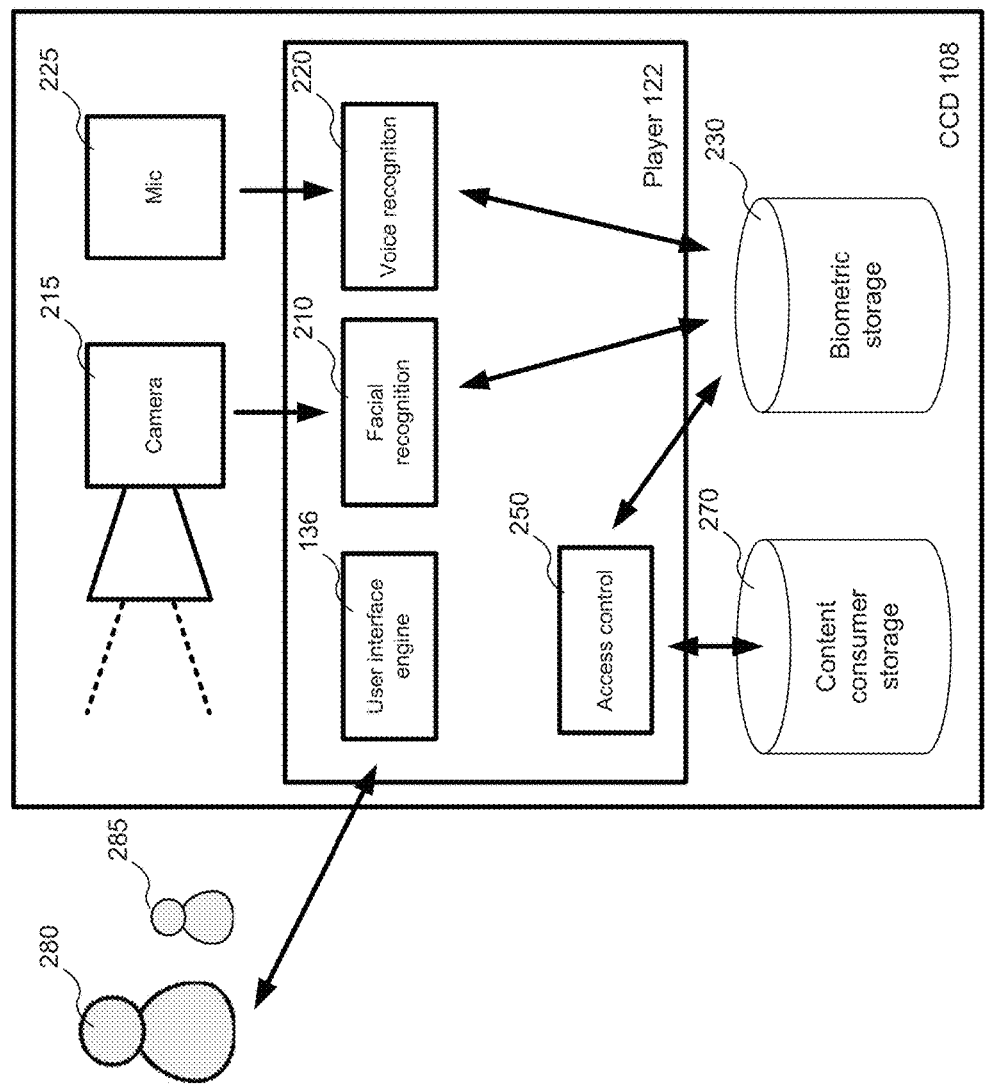
FIG. 2 is a block diagram illustrating an example arrangement for controlling access to content based on content-consumer identity, in accordance with various embodiments.

Referring now to FIG. 2, an example arrangement 200 for controlling access to content based on content-consumer identity is illustrated in accordance with various embodiments. In various embodiments, the arrangement 200 may include the player 122 of the content consumption device 108. In various embodiments, the player 122 may be configured to include one or more modules to perform various activities related to control of access to content based on content-consumer identity as described herein. However, in various embodiments, one or more operations described herein may be performed by entities other than the player 122, and may be performed outside of the content consumption device 108. Further, in various embodiments, the entities illustrated in arrangement 200 may be combined, split into additional entities, and/or omitted entirely.

In various embodiments, the player 122 may interact with one more or more input devices 116, as described above. In particular, the player 122 may interact with a camera 215 for purposes of identifying content consumers (such as, for example, content consumers 280 and 285) that are physically proximate to the content consumption device 108. In various embodiments, the camera 215 may be configured to capture and provide input video data and/or still images, which may be used for facial recognition of one or more content consumers. In various embodiments, the camera 215 may be physically incorporated into the content consumption device 108; in other embodiments, the camera 215 may be physically separate from the content consumption device 108, but may be operatively coupled to the content consumption device 108 (as well as to the player 122), such as, for example through use of a wired or wireless network, or other data transfer technology. In various embodiments, the camera 215 may comprise various form factors, including web cams, phone cameras, single-lens reflex ("SLR") cameras, video cameras, etc. In various embodiments, the content consumption device 108 may be configured with a motion detector (not illustrated) to aid in capture of images and/or video of content consumers 280, 285, etc. In various embodiments, the camera 215 may be configured to modify capture of images and/or video, such as by moving, panning, tilting, zooming, etc., in order to capture higher-quality video and/or images of content consumers. In various embodiments, such modification of capture may be facilitated by information provided by the motion detector.

In various embodiments, the camera 215 may provide the input video data and/or still images to a facial recognition module 210 ("FR 210"), which may be configured to perform facial recognition on one or more features of faces of content consumers whose images are captured by the camera 215. In various embodiments the facial recognition module 210 may be configured to store and retrieve biometric data related to facial features in a biometric storage 230. In various embodiments, the biometric storage 230 may be configured to be part of the player 122 or may be separately situated from the player 122. In various embodiments, the FR 210 may be configure to utilize understood facial recognition techniques to recognize faces in image and/or video data captured by the camera 215.

In various embodiments, the player 122 may, in addition or in lieu of interaction with the camera 215, interact with a microphone 225 for purposes of identifying content consumers (such as, for example, content consumers 280 and 285) that are physically proximate to the content consumption device 108. In various embodiments, the microphone 225 may be configured to capture and provide audio data, and in particular speech data, which may be used for voice recognition of one or more content consumers. In various embodiments, the microphone 225 may be physically incorporated into the content consumption device 108; in other embodiments, the microphone 225 may be physically separate from the content consumption device 108, but may be operatively coupled to the content consumption device 108 (as well as to the player 122), such as, for example through use of a wired or wireless network, or other data transfer technology. In various embodiments, the microphone 225 may provide the input audio data to a voice recognition module 220 ("VR 220"), which may be configured to perform voice recognition on the captured audio data. In various embodiments the vVR 220 may be configured to store and retrieve biometric data related to voice features in the biometric storage 230.

In various embodiments, the presentation engine may include an access control module 250 ("AC 250"). In various embodiments, the AC 250 may be configured to receive information from the FR 210 and/or the VR 220 to identity one or more content consumers, such as content consumers 280 and 285. In various embodiments, the AC 250 may be configured to store and retrieve information about one or more content consumers from a content consumer storage 270 ("CCS 270"). In various embodiments, the content consumer information stored at the CCS 270 may include identity information for one or more content consumers, such as, for example, name, age, sex, etc. In various embodiments, the content consumer information stored at the CCS 270 may include content access permission information for one or more content consumers. In various embodiments, this content access permission may include indicators of one or more types of content which may be accessed by a content consumer. In various embodiments, this content access permission may include indicators of one or more types of content which may not be accessed by a content consumer.

In various embodiments, the AC 250 may be configured to identify one or more content consumers. In various embodiments, the AC 250 may be configured to perform such identification though assignment of a unique identity to a content consumer. In such embodiments, the AC 250 may be able to determine a particular set of access permissions that is uniquely associated with the identified content consumer.

In other embodiments, the AC 250 may be configured to identify a content consumer as belonging to a class or group. For example, the AC 250 may identity a content consumer as belonging to a particular age range. In such an example, the AC 250 may identity the content consumer 280, which is an adult, as having an age over 18, while the AC 250 may identify the child content consumer 285 as being under age 18 (or under age 16, age 13, etc.). In various embodiments, the AC 250 may be configured to perform such identification without necessarily having to uniquely identify the content consumer. For example, the AC 250 may identify the child content consumer 285 as having a voice that falls in a register that is likely to be a child. In another example, the he AC 250 may identify the child content consumer 285 as being of a height that suggests that the child content consumer 285 is a child.

In various embodiments, the AC 250 may be configured to determine if identified content consumers may be permitted to access content. For example the AC 250 may be configured to compare access permissions that are stored in the CCS 270 to metadata describing a piece of content (not illustrated). For example, the AC 250 may be configured to compare As described above, the player 122 may also include the user interface engine 136 ("UI 136"). In various embodiments, the UI 136 may be configured to interact with one or more content consumers, such as content consumer 280. In various embodiments, the UI 136 may be configured to receive one or more access permissions from a content consumer, such as content consumer 280; these access permissions may be for the content consumer 280 themselves, and/or for another content consumer, such as child content consumer 285. In various embodiments, the UI 136 may be configured to request a password or pass phrase be spoken by the content consumer 280 in order to authenticate the identity of the content consumer 280, such as when receiving access permissions. In various embodiments, the password or pass phrase may be provided, such as by being provided on the display 124, at the time the content consumer 180 attempts to modify or provide access permissions. The AC 250 may then be used to identify the speaker to provide additional security for receipt of access permissions. In various embodiments, the UI 136 may also be configured to request and receive overrides from the content consumer 280, such as when access to a piece of content is denied (for example due to the presence of a child content consumer 285) and the content consumer 280 wishes to access the piece of content anyway. Particular examples of user interaction with the player 122 are described below.

Figure 3:
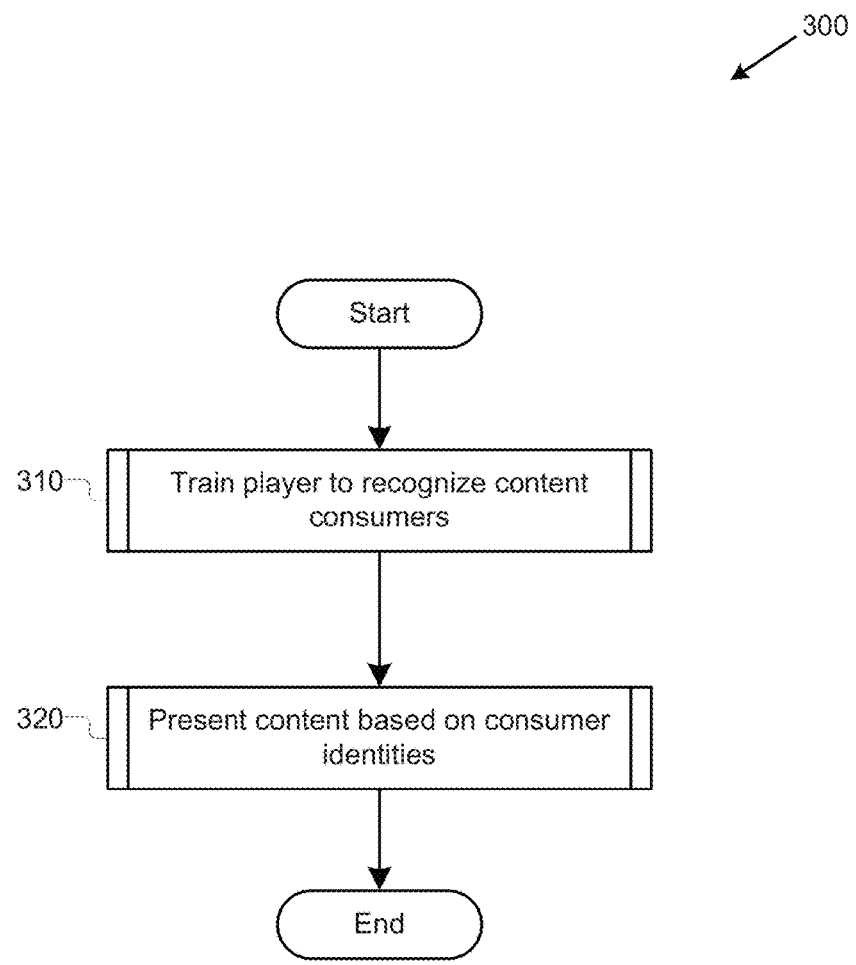
FIG. 3 illustrates an example process for presenting content, in accordance with various embodiments.

Referring now to FIG. 3, an example process 300 for controlling access to content is illustrated in accordance with various embodiments. While FIG. 3 illustrates particular example operations for process 300, in various embodiments, process 300 may include additional operations, omit illustrated operations, and/or combine illustrated operations. In various embodiments, process 300 may be performed by one or more entities of the player 122 illustrated in FIG. 2.

The process may begin at operation 310, where the player 122 may be trained, such as by the adult content consumer 280, to recognize and control access to content to content consumers. Particular implementations of operation 310 may be described below with reference to process 400 of FIG. 4. At operation 320, the player 122 may present content based on one or more identities of content consumers. Particular implementations of operation 320 may be described below with reference to process 500 of FIG. 5. The process may then repeat for additional training at operation 310 and presentation at operation 320, or the process may end.

Figure 4:
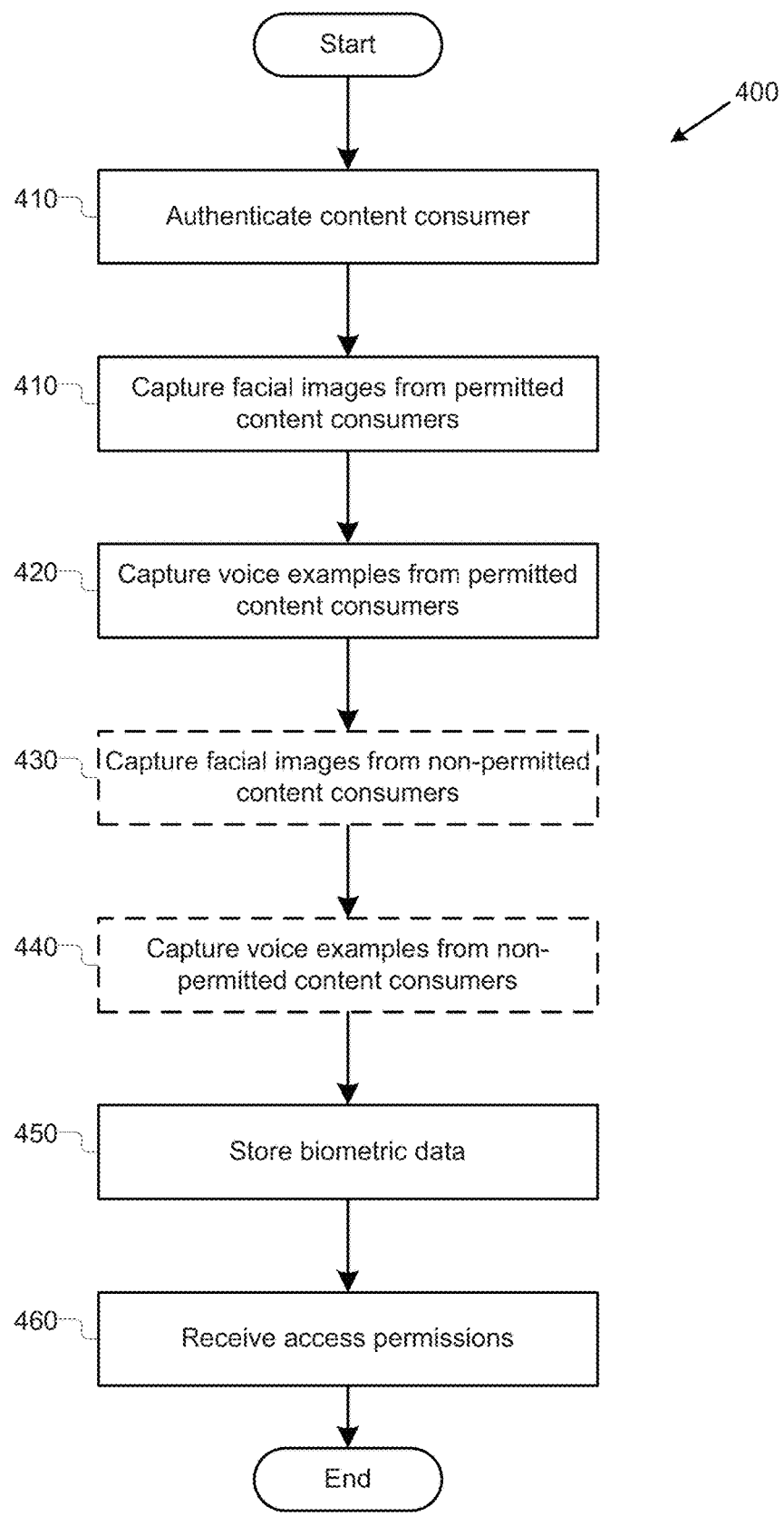
FIG. 4 illustrates an example process for training a content consumption device to perform identity-based access control, in accordance with various embodiments.

Referring now to FIG. 4, an example process 400 for training a player 122 to perform identity-based access control is illustrated in accordance with various embodiments. While FIG. 4 illustrates particular example operations for process 400, in various embodiments, process 400 may include additional operations, omit illustrated operations, and/or combine illustrated operations. Process 400 may include implementations of operation 310 of process 300 of FIG. 3. In various embodiments, aspects of process 400 may be performed by the UI 136 and/or the AC 250 of the player 122.

The process may begin at operation 405, where the UI 136 may authenticate a content consumer that is attempting to train the player 122. In some embodiments, if previous facial and/or voice biometric data for the content consumer has been received by the player 122, then at operation 405, the UI 136 may request that the AC 250 identify the content consumer using image and/or video data from the camera 215 or audio data from the microphone 225. In some embodiments, the content consumer may in addition or in lieu of these identification processes, be requested by the UI 136 to speak a password or pass phrase that is currently displayed on the display 124. Audio data from the content consumer speaking this password or pass phrase may then be compared by the VM 220 to biometric data for the content consumer (and/or for known content consumers that are authorized to train the player 122) to determine the identity of the content consumer. In various embodiments, in lieu of, or in addition to, a password or pass phrase, the player 122 may cause a series of random series of words and/or numbers that are displayed on the display 124. In various embodiments, by requesting that the content consumer speak a password, pass phrase, and/or random words and/or numbers, the player 122 may increase security by preventing another content consumer from using a printed image of the content consumer to pretend to be the content consumer when training the player 122. In various embodiments, operation 405 may not be performed, such as when first training the player 122 before any identities are known to the AC 250.

Next, at operation 410, the player 122, and in particular the FM 210, may capture facial images from content consumers that may be permitted to access content and/or set access permissions for content. In various embodiments, the player 122 may be configured to cause the camera 215 to capture images and/or video and to extract facial images from the captured images. At operation 420, the player 122, and in particular the VM 220, may capture voice examples from content consumers that may be permitted to access content and/or set access permissions for content. In various embodiments, the player 122 may be configured to cause the microphone 225 to capture audio data while the content consumers speak. In various embodiments, the content consumers may be given particular speaking prompts, and/or may be permitted to speak freely.

Next, at operation 430, the player 122, and in particular the FM 210, may capture facial images from content consumers that may not be permitted to access content and/or set access permissions for content. For example, at operation 430, facial images of one or more children may be captured. Similarly, at operation 440, the player 122, and in particular the VM 220, may capture voice examples from content consumers that may not be permitted to access content and/or set access permissions for content. In various embodiments, operations 430 and 440 may be performed in order to more accurately identify those content consumers that may not be permitted to access content. However, in other embodiments, operations 430 and/or 440 may not be performed, and biometric data may only be obtained for permitted content consumers. Next, at operation 450, the player 122, and in particular the FM 210 and/or the VM 220, may store biometric data from the captured facial images and voice examples. In various embodiments, generation and storage of the biometric data may be performed according to known techniques.

At operation 460, the UI 136 of the player 122 may receive access permissions relating to the content consumers (and/or other content consumers for whom data was previously received). In various embodiments, access permissions received at operation 460 may include indications of types of content that are permitted for different content consumers. In other embodiments, access permissions received at operation 460 may include indications of types of content that are permitted for different ages or age ranges of content consumers without reference to particular content consumers. Thus, an access permission may detail that R-rated films may not be viewed by content consumers under 16. In another embodiment access permissions may include indications of which content consumers are permitted to provide access permissions in the future. In such embodiments, during future performances of process 400, operation 405 may be performed to authenticate a content consumer as previously having been given permission to change access permissions prior to allowing the content consumer to change access permissions. The process may then end.

Figure 5:
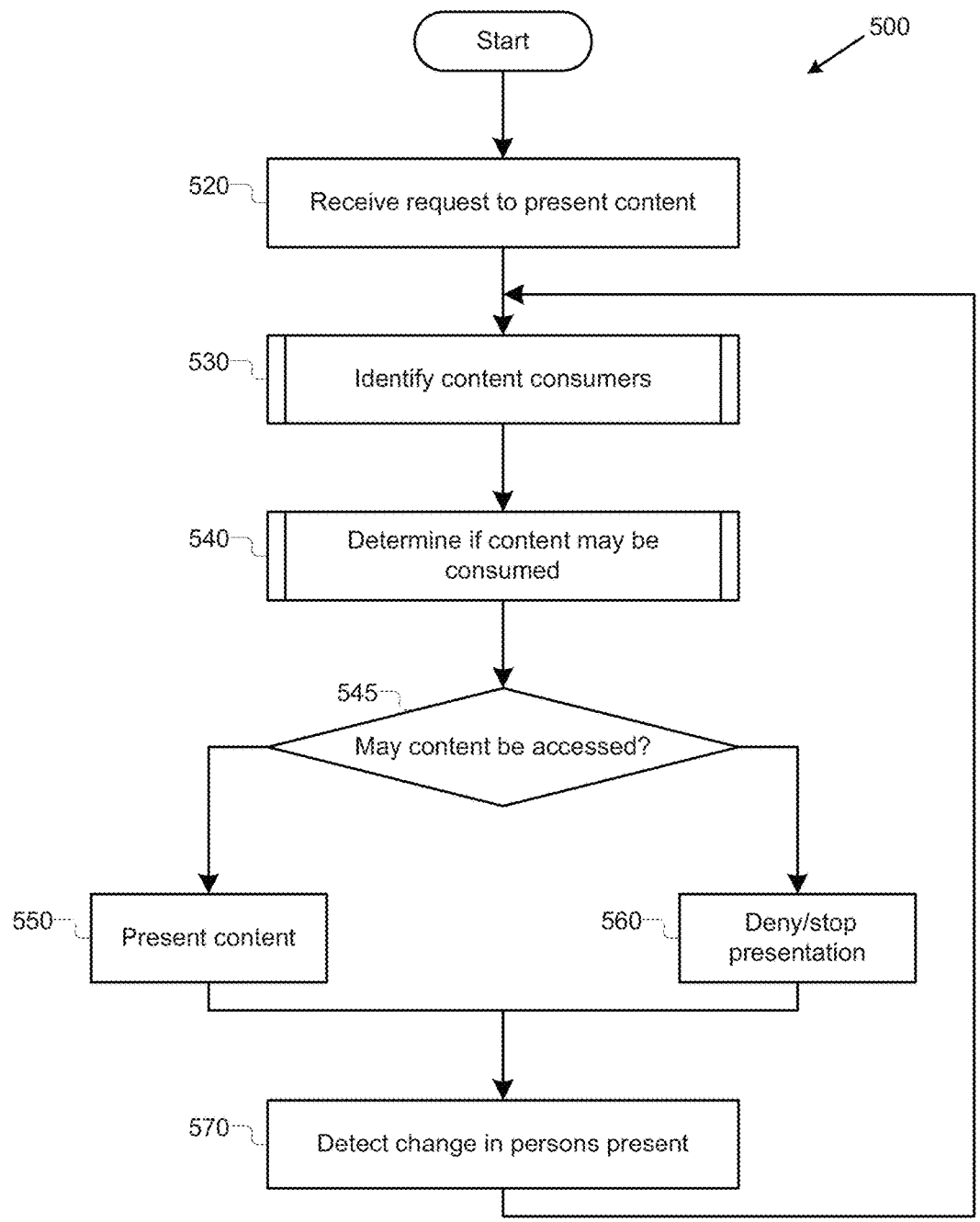
FIG. 5 illustrates an example process for presenting content based on content consumer identities, in accordance with various embodiments.

Referring now to FIG. 5, an example process 500 for presenting content based on content consumer identities is illustrated in accordance with various embodiments. While FIG. 5 illustrates particular example operations for process 500, in various embodiments, process 500 may include additional operations, omit illustrated operations, and/or combine illustrated operations. Process 500 may include implementations of operation 330 of process 300 of FIG. 3. In various embodiments, aspects of process 500 may be performed by the UI 136 and/or the AC 250 of the player 122.

The process may begin at operation 520, where the player 122 may receive a request to present a piece of content. Next, at operation 530, the player 122, and in particular the AC 250, may identify one or more content consumers that are physically proximate to the content consumption device 108. Particular implementations of operation 530 may be described below with reference to process 600 of FIG. 6. Next, at operation 540, the player 122, and in particular the AC 250, may determine if the piece of content may be presented to the identified one or more content consumers. Particular implementations of operation 540 may be described below with reference to process 700 of FIG. 7.

Next, at decision operation 545, the AC 250 may perform different actions based on whether the content may be presented. Thus, if the piece of content may be presented to the identified content consumers, at operation 550, the piece of content may be presented. However, if the piece of content may not be presented to the identified content consumers, at operation 560, the player 122 may deny presentation of the piece of content or may stop presentation of the piece of content if it is currently ongoing.

In either event, at operation 570, the player 122 may detect if there is a change in persons that are physically proximate to the content consumption device 108. If the persons that are physically proximate has changed, such as if a child or other non-permitted content consumer has entered a room with the content consumption device 108, then the process may repeat at operation 530, where the changed persons in the room may be identified and the process started over. Similarly, if a non-permitted content consumer has left the room, the process may repeat. Otherwise, presentation may continue or remain denied without change.

Figure 6:
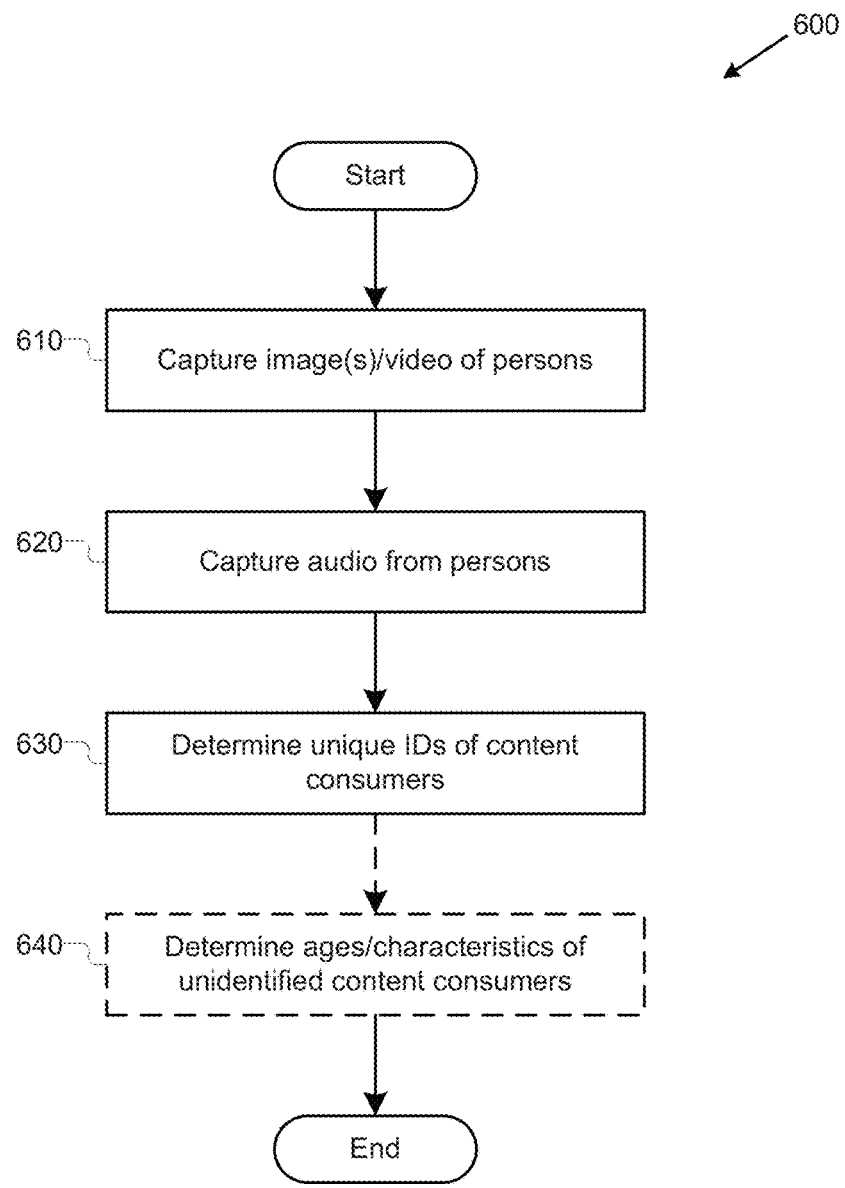
FIG. 6 illustrates an example process for identifying content consumers, in accordance with various embodiments.

Referring now to FIG. 6, an example process 600 for identifying content consumers identities is illustrated in accordance with various embodiments. While FIG. 6 illustrates particular example operations for process 600, in various embodiments, process 600 may include additional operations, omit illustrated operations, and/or combine illustrated operations. Process 600 may include implementations of operation 530 of process 500 of FIG. 5. In various embodiments, aspects of process 600 may be performed by the AC 250 of the player 122.

The process may begin at operation 610, where the FM 210 may cause the camera 215 to capture image and/or video of one or more content consumers that are physically proximate to the content consumption device 108. At operation 620, the VM 220 may cause the microphone 225 to capture audio data from the one or more content consumers as well. In various embodiments, one or both of operations 610 and 620 may be performed to capture data for identification of content consumers.

Next, at operation 630, the AC 250, in coordination with the FM 210 and the VM 220, may determine unique identities of content consumers that are physically proximate to the content consumption device 108. In various embodiments, the FM 210 and VM 220 may perform one or more facial and/or voice recognition techniques to identify the one or more content consumers from whom images, video and/or audio data was previously captured. In various embodiments, these facial and/or voice recognition techniques may be performed with reference to stored biometric data, such as data stored in the biometric storage 230. Next, at operation 640, the AC 250, in coordination with the FM 210 and the VM 220, may optionally determine ages (or age ranges) of content consumers that were not previously identified. For example, as discussed above, the AC 250 may determine that a content consumer is likely to be below a particular age threshold, and therefore may be too young to be permitted to access a piece of content. In other embodiments, rather than determine ages, the AC 250 may be configured to determine other characteristics of content consumers or that content consumers belong to a particular class or group, such as sex, or spoken language characteristics. After operation 640, the process may then end.

Figure 7:
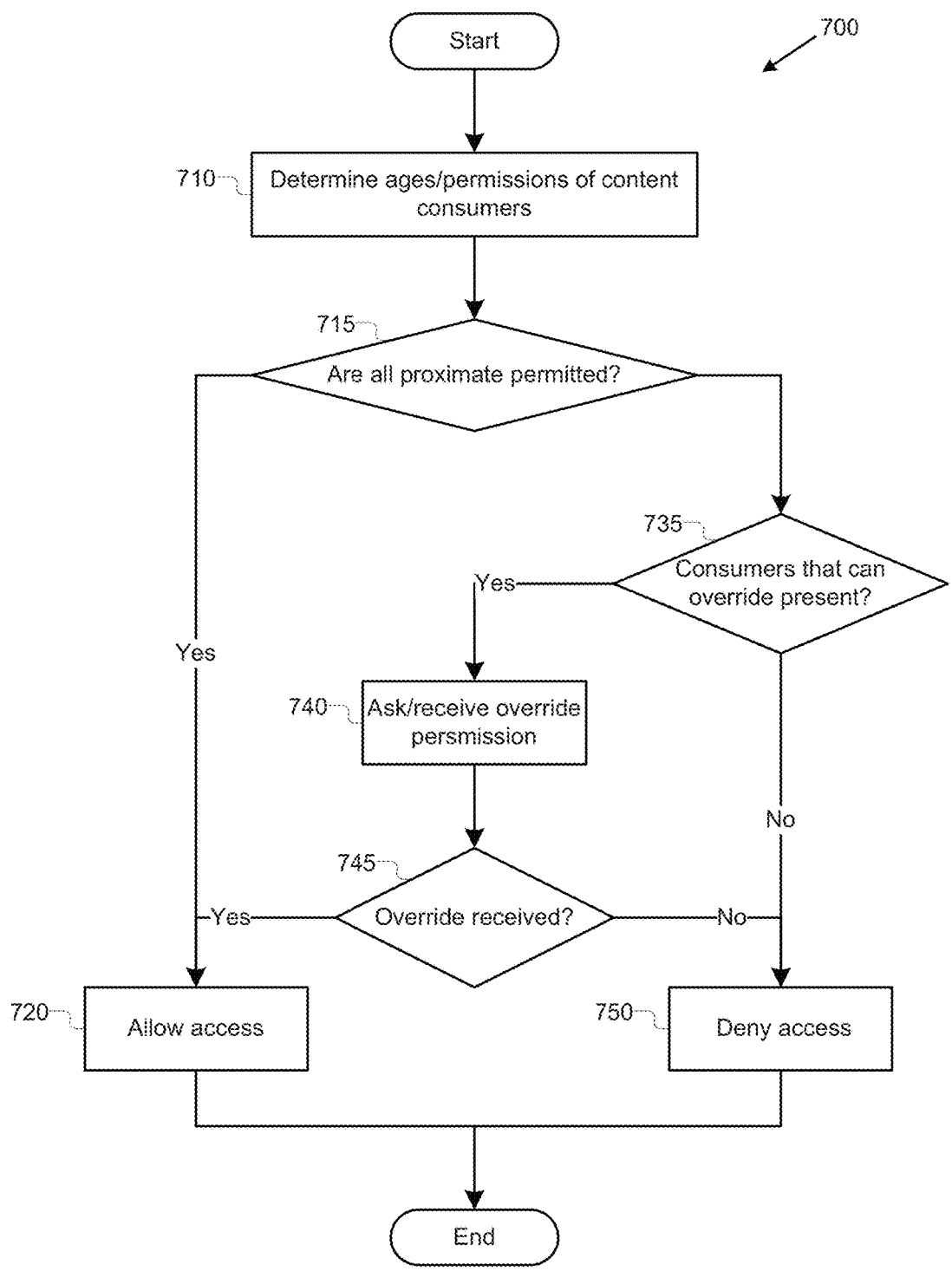
FIG. 7 illustrates an example process for determining if content may be presented, in accordance with various embodiments.

Referring now to FIG. 7, an example process 700 for determining if content may be presented is illustrated in accordance with various embodiments. While FIG. 7 illustrates particular example operations for process 700, in various embodiments, process 700 may include additional operations, omit illustrated operations, and/or combine illustrated operations. Process 700 may include implementations of operation 540 of process 500 of FIG. 5. In various embodiments, aspects of process 700 may be performed by the AC 250 of the player 122.

The process may begin at operation 710, where the AC 250 may determine content consumer information, such as one or more ages/permissions of the content consumers that are physically proximate to the content consumption device. In various embodiments, the AC 250 may retrieve this content consumer information from the content consumer storage 270.

Next, at decision operation 715, the AC 250 may determine if all content consumers that are physically proximate are permitted to access the piece of content. In various embodiments, the AC 250 may perform this determination by comparing the content consumer information determined at operation 710 with metadata associated with the piece of content. If all content consumers are allowed to access the piece of content, then at operation 720, the AC 250 may allow access to the piece of content and the process may then end.

If, however, all content consumers that are physically proximate are not allowed to access the piece of content, then at decision operation 735, the AC 250 may determine if any content consumers are physically proximate that are permitted to override denial of access. If not, then no override is possible, and at operation 750, the AC 250 may deny access. If, however, there is at least one content consumer physically proximate to the content consumption device 108 that is permitted to override the denial of access, then at operation 740, the UI 136 may ask for override permission. For example, during denial of access, a prompt may be displayed letting content consumers may override the denial of access. At decision operation 745, the AC 250 may determine if a content consumer that is permitted to override the denial has requested an override (such as by saying an override phrase). If so, then at operation 720 access to the content is allowed. If not, then at operation 750, access is denied. The process may then end.

Figure 8:
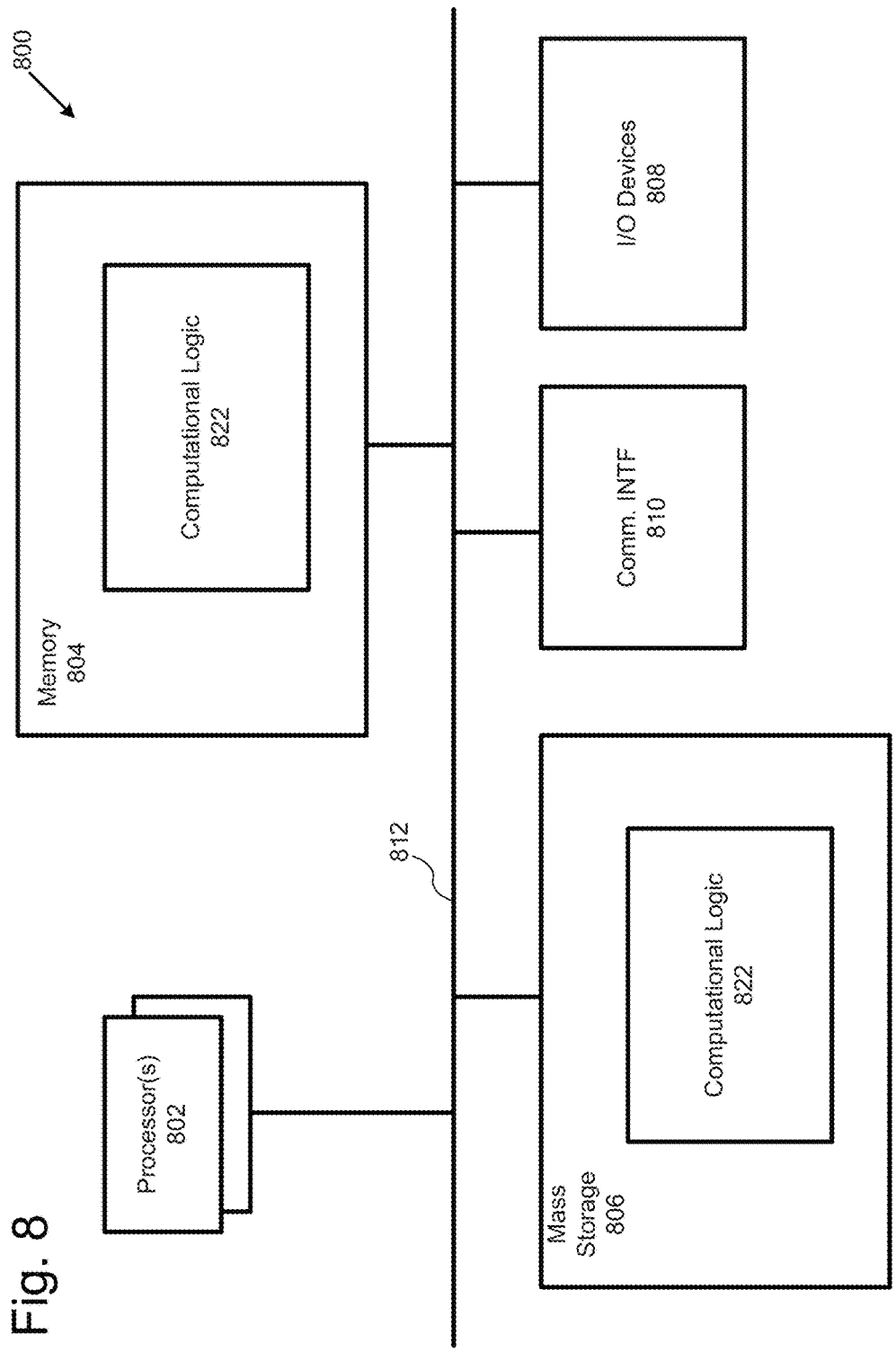
FIG. 8 illustrates an example computing environment suitable for practicing various aspects of the present disclosure, in accordance with various embodiments.

Referring now to FIG. 8, an example computer suitable for practicing various aspects of the present disclosure, including processes of FIGS. 3-7, is illustrated in accordance with various embodiments. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control, remote control, gaming controller, image capture device, and so forth) and communication interfaces 810 (such as network interface cards, modems, infrared receivers, radio receivers (e.g., Bluetooth), and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with content consumption device 108, e.g., operations associated with camera control such as shown in FIGS. 2, 4, and 6. The various elements may be implemented by assembler instructions supported by processor(s) 602 or high-level languages, such as, for example, C, that can be compiled into such instructions.

The permanent copy of the programming instructions may be placed into permanent storage devices 806 in the factory, or in the field, through, for example, a distribution medium (not shown), such as a compact disc (CD), or through communication interface 810 (from a distribution server (not shown)). That is, one or more distribution media having an implementation of the agent program may be employed to distribute the agent and program various computing devices.

The number, capability and/or capacity of these elements 810-812 may vary, depending on whether computer 800 is used as a content aggregator/distributor server 104 or a content consumption device 108 (e.g., a player 122). Their constitutions are otherwise known, and accordingly will not be further described.

Figure 9:
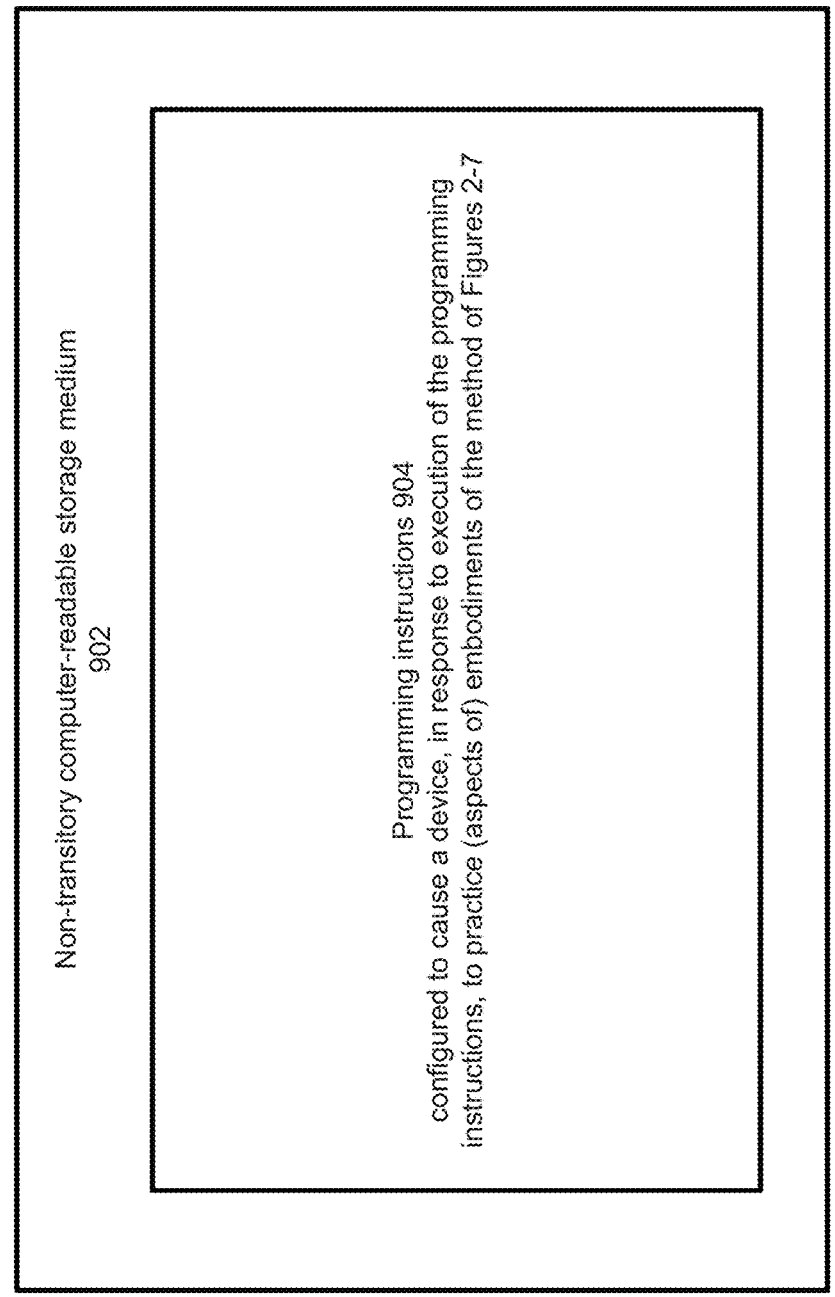
FIG. 9 illustrates an example storage medium with instructions configured to enable an apparatus to practice various aspects of the present disclosure, in accordance with various embodiments.

FIG. 9 illustrates an example least one computer-readable storage medium 902 having instructions configured to practice all or selected ones of the operations associated with content consumption device 108, e.g., operations associated with control of access to content, earlier described, in accordance with various embodiments. As illustrated, least one computer-readable storage medium 902 may include a number of programming instructions 904. Programming instructions 904 may be configured to enable a device, e.g., computer 800, in response to execution of the programming instructions, to perform, e.g., various operations of processes of FIGS. 3-7, e.g., but not limited to, to the various operations performed to perform determination of frame alignments. In alternate embodiments, programming instructions 904 may be disposed on multiple least one computer-readable storage media 902 instead.

Referring back to FIG. 8, for one embodiment, at least one of processors 802 may be packaged together with computational logic 822 configured to practice aspects of processes of FIGS. 3-7. For one embodiment, at least one of processors 802 may be packaged together with computational logic 822 configured to practice aspects of processes of FIGS. 3-7 to form a System in Package (SiP). For one embodiment, at least one of processors 802 may be integrated on the same die with computational logic 822 configured to practice aspects of processes of FIGS. 3-7. For one embodiment, at least one of processors 802 may be packaged together with computational logic 822 configured to practice aspects of processes of FIGS. 3-7 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 includes one or more computer-readable storage media including a plurality of instructions configured to cause a computing device, in response to execution of the instructions by the computing device, to facilitate consumption of content. The instructions cause the computing device to: identify, in association with presentation of a piece of content on the computing device, one or more content consumers that are physically proximate to the computing device; determine one or more access permissions for the identified one or more content consumers; and control access to the content based on the determined one or more access permissions.

Example 2 includes the computer-readable storage media of example 1, wherein identify one or more content consumers includes perform facial recognition on the one or more content consumers.

Example 3 includes the computer-readable storage media of example 1, wherein identify one or more content consumers includes perform voice recognition of the one or more content consumers.

Example 4 includes the computer-readable storage media of example 1, wherein identify one or more content consumers includes identify a unique identity for a content consumer.

Example 5 includes the computer-readable storage media of example 1, wherein determine one or more access permissions includes determine one or more age-based access permissions.

Example 6 includes the computer-readable storage media of example 1, wherein control access to the piece of content based on the determined one or more access permissions includes deny access to the content.

Example 7 includes the computer-readable storage media of example 1, wherein determine one or more access permissions includes determine access permissions associated with metadata describing the piece of content.

Example 8 includes the computer-readable storage media of example 7, wherein the metadata describing the piece of content describes one or more age ranges that are permitted to consume the content.

Example 9 includes the computer-readable storage media of example 8, wherein identify one or more content consumers includes identify an age or an age range for a content consumer.

Example 10 includes the computer-readable storage media of example 9, wherein identify an age range for a content consumer includes identify that a content consumer is below or is likely to be below an age threshold described by the metadata describing the content.

Example 11 includes the computer-readable storage media of example 10, wherein control presentation of the content includes deny access to the piece of media content based on the identify that a content consumer is below or is likely to be below a predetermined age threshold described by the metadata describing the content.

Example 12 includes the computer-readable storage media of any of examples 1-11, wherein the instructions are further configured to cause the computing device to: receive an override command after denial of access to the piece of content; and allow access to the piece of content based on the received override command.

Example 13 includes the computer-readable storage media of example 12, wherein receive an override command includes receive an override command from a content consumer identified to have permission to override denial of access to the content.

Example 14 includes the computer-readable storage media of any of examples 1-11, wherein the instructions are further configured to cause the computing device to receive the one or more access permissions from an authorized content consumer.

Example 15 includes the computer-readable storage media of example 14, wherein receive the one or more access permissions from an authorized content consumer includes: authenticate a person physically proximate to the computing device as the authorized content consumer; and receive the one or more access permissions from the authenticated person.

Example 16 includes the computer-readable storage media of example 15, wherein authenticate the person physically proximate to the computing device as the authorized content consumer includes: provide one or more words and/or numbers to the person for the person to read aloud; capture audio of the person reading the one or more words and/or numbers; and authenticate the person by performing voice recognition on the captured audio.

Example 17 includes an apparatus for facilitating consumption of content. The apparatus includes one or more computing processors and a player module configured to operate on the one or more computing processors to present a piece of content. The apparatus also includes one or more facial and/or voice recognition modules configured to operate on the one or more computing processors to identify, in association with presentation of the piece of content, one or more content consumers that are physically proximate to the apparatus. The apparatus also includes an access control module configured to operate on the one or more computing processors to: determine one or more access permissions for the identified one or more content consumers; and control access to the content based on the determined one or more access permissions.

Example 18 includes the apparatus of example 17, wherein identify one or more content consumers includes perform facial recognition on the one or more content consumers.

Example 19 includes the apparatus of example 17, wherein identify one or more content consumers includes perform voice recognition of the one or more content consumers.

Example 20 includes the apparatus of example 17, wherein identify one or more content consumers includes identify a unique identity for a content consumer.

Example 21 includes the apparatus of example 17, wherein determine one or more access permissions includes determine one or more age-based access permissions.

Example 22 includes the apparatus of example 17, wherein control access to the piece of content based on the determined one or more access permissions includes deny access to the content.

Example 23 includes the apparatus of example 17, wherein determine one or more access permissions includes determine access permissions associated with metadata describing the piece of content.

Example 24 includes the apparatus of example 23, wherein the metadata describing the piece of content describes one or more age ranges that are permitted to consume the content.

Example 25 includes the apparatus of example 24, wherein identify one or more content consumers includes identify an age or an age range for a content consumer.

Example 26 includes the apparatus of example 25, wherein identify an age range for a content consumer includes identify that a content consumer is below or is likely to be below an age threshold described by the metadata describing the content.

Example 27 includes the apparatus of example 26, wherein control presentation of the content includes deny access to the piece of media content based on the identify that a content consumer is below or is likely to be below a predetermined age threshold described by the metadata describing the content.

Example 28 includes the apparatus of any of examples 17-27, wherein the access control module is further configured to operate on the one or more computing processors to: receive an override command after denial of access to the piece of content; and allow access to the piece of content based on the received override command.

Example 29 includes the apparatus of example 28, wherein receive an override command includes receive an override command from a content consumer identified to have permission to override denial of access to the content.

Example 30 includes the apparatus of any of examples 17-27, wherein the access control module is further configured to operate on the one or more computing processors to receive the one or more access permissions from an authorized content consumer.

Example 31 includes the apparatus of example 30, wherein receive the one or more access permissions from an authorized content consumer includes: authenticate a person physically proximate to the apparatus as the authorized content consumer; and receive the one or more access permissions from the authenticated person.

Example 32 includes the apparatus of example 31, wherein authenticate the person physically proximate to the apparatus as the authorized content consumer includes: provide one or more words and/or numbers to the person for the person to read aloud; capture audio of the person reading the one or more words and/or numbers; and authenticate the person by performing voice recognition on the captured audio.

Example 33 includes a computer-implemented method for facilitating consumption of content. The method includes: presenting, by a computing device, a piece of content; identifying, by the computing device, and in association with presentation of the piece of content, one or more content consumers that are physically proximate to the apparatus; determining, by the computing device, one or more access permissions for the identified one or more content consumers; and controlling, by the computing device, access to the content based on the determined one or more access permissions.

Example 34 includes the method of example 33, wherein identifying one or more content consumers includes performing facial recognition on the one or more content consumers.

Example 35 includes the method of example 33, wherein identifying one or more content consumers includes performing voice recognition of the one or more content consumers.

Example 36 includes the method of example 33, wherein identifying one or more content consumers includes identifying a unique identity for a content consumer.

Example 37 includes the method of example 33, wherein determining one or more access permissions includes determining one or more age-based access permissions.

Example 38 includes the method of example 33, wherein controlling access to the piece of content based on the determined one or more access permissions includes denying access to the content.

Example 39 includes the method of example 33, wherein determining one or more access permissions includes determining access permissions associated with metadata describing the piece of content.

Example 40 includes the method of example 39, wherein the metadata describing the piece of content describes one or more age ranges that are permitted to consume the content.

Example 41 includes the method of example 40, wherein identifying one or more content consumers includes identifying an age or an age range for a content consumer.

Example 42 includes the method of example 41, wherein identifying an age range for a content consumer includes identifying that a content consumer is below or is likely to be below an age threshold described by the metadata describing the content.

Example 43 includes the method of example 42, wherein controlling presentation of the content includes denying access to the piece of media content based on the identifying that a content consumer is below or is likely to be below a predetermined age threshold described by the metadata describing the content.

Example 44 includes the method of any of examples 33-43, further including: receiving, by the computing device, an override command after denial of access to the piece of content; and allowing, by the computing device, access to the piece of content based on the received override command.

Example 45 includes the method of example 44, wherein receiving an override command includes receiving an override command from a content consumer identified to have permission to override denial of access to the content.

Example 46 includes the method of any of examples 33-43, further including receiving the one or more access permissions from an authorized content consumer.

Example 47 includes the method of example 46, wherein receiving the one or more access permissions from an authorized content consumer includes: authenticating a person physically proximate to the apparatus as the authorized content consumer; and receiving the one or more access permissions from the authenticated person.

Example 48 includes the method of example 47, wherein authenticating the person physically proximate to the apparatus as the authorized content consumer includes: providing one or more words and/or numbers to the person for the person to read aloud; capturing audio of the person reading the one or more words and/or numbers; and authenticating the person by performing voice recognition on the captured audio.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable storage media comprising a plurality of instructions configured to cause a computing device, in response to execution of the instructions by the computing device, to:

receive a request for presentation of content on the computing device, wherein the content comprises media content having at least one of video, audio, or closed captioning for the presentation on the computing device;

determine a plurality of access permissions for a plurality of content consumers;

control presentation of the content based on a determined plurality of access permissions of a plurality of content consumers physically proximate to the computing device;

determine whether to present the content based on a result of the determined permissions of the plurality of content consumers physically proximate to the computing device after a content consumer is no longer physically proximate to the computing device or has become physically proximate to the computing device; and present the content on determination that the plurality of content consumers physically proximate to the computing device all have access permissions compatible with content wherein to determine permissions of the plurality of content consumers further includes to:
provide one or more words and/or numbers for one of the plurality of content consumers to read aloud;
capture audio of the one of the plurality of content consumers reading the one or more words and/or numbers; and
authenticate the one of the plurality of content consumers by performing voice recognition on the captured audio.

2. The non-transitory computer-readable storage media of claim 1, wherein the computing device is further caused to obtain biometric data of the plurality of content consumers that are physically proximate to the computing device, compare the obtained biometric data with stored biometric data, and identify, based on the comparison, the plurality of content consumers that are physically proximate to the computing device, wherein obtain biometric data from a plurality of content consumers comprises obtain facial recognition data for the plurality of content consumers.

3. The non-transitory computer-readable storage media of claim 2, wherein obtain biometric data from a plurality of content consumers comprises obtain voice recognition data for the plurality of content consumers.

4. The non-transitory computer-readable storage media of claim 2, wherein identify the plurality of content consumers comprises identify a unique identity for every content consumer of the plurality of content consumers.

5. The non-transitory computer-readable storage media of claim 1, wherein determine a plurality of access permissions comprises determine a plurality of age-based access permissions.

6. The non-transitory computer-readable storage media of claim 1, wherein control presentation of a piece of content collectively based on the determined plurality of access permissions comprises deny access to the content to the entire plurality of content consumers.

7. The non-transitory computer-readable storage media of claim 1, wherein determine a plurality of access permissions further comprises determine access permissions associated with metadata describing the content.

8. The non-transitory computer-readable storage media of claim 7, wherein the metadata describing the content describes one or more age ranges that are permitted to consume the content.

9. The non-transitory computer-readable storage media of claim 8, wherein identify the plurality of content consumers comprises identify an age or an age range for every content consumer of the plurality of content consumers.

10. The non-transitory computer-readable storage media of claim 9, wherein identify an age range for every content consumer of the plurality of content consumers comprises identify for every content consumer of the plurality of content consumers if a content consumer is below or is likely to be below an age threshold indicated by metadata describing the content.

11. The non-transitory computer-readable storage media of claim 10, wherein control presentation of the content collectively comprises deny access to the content based on whether least one of the plurality of content consumers is below or is likely to be below the age threshold.

12. The non-transitory computer-readable storage media of claim 11, wherein the instructions are further configured to cause the computing device to:
receive an override command after denial of access to the content; and
allow access to the content based on the received override command.

13. The non-transitory computer-readable storage media of claim 12, wherein receive an override command comprises receive an override command from a content consumer identified to have permission to override denial of access to the content.

14. The non-transitory computer-readable storage media of claim 1, wherein the instructions are further configured to cause the computing device to receive the plurality of access permissions from an authorized one of the plurality of content consumers.

15. The non-transitory computer-readable storage media of claim 14, wherein receive the plurality of access permissions from an authorized one of the content consumers comprises:
authenticate one of the plurality of content consumers physically proximate to the computing device as the authorized content consumer; and
receive the plurality of access permissions from the authenticated one of the plurality of content consumers.

16. The non-transitory computer-readable storage media of claim 2, wherein the biometric data is associated with at least one of voice features or facial features.

17. An apparatus, comprising:
one or more computing processors;
physical memory coupled with the one or more processors;
a player module, to be loaded into the physical memory and executed by the one or more processors, to present a piece of content comprising at least one of video, audio, or closed captioning; and
an access control module, to be loaded into the physical memory and executed by the one or more processors, to:
determine a plurality of access permissions for a plurality of content consumers;
control access to the content collectively based on a determined plurality of access permissions of a plurality of content consumers physically proximate to a computing device;
determine whether to present the content based on a result of the determined permissions of the plurality of content consumers physically proximate to the computing device after a content consumer is no longer physically proximate to the computing device or has become proximate to the computing device; and present the content on determination that the plurality of content consumers physically proximate to the computing device all have access permissions compatible with content;

wherein to determine permissions of the plurality of content consumers further includes to:

provide one or more words and/or numbers for one of the plurality of content consumers to read aloud;

capture audio of the one of the plurality of content consumers reading the one or more words and/or numbers; and authenticate the one of the plurality of content consumers by performing voice recognition on the captured audio.

18. The apparatus of claim 17, further comprising one or more facial and/or voice recognition modules, to operate on the one or more computing processors to: obtain biometric data from a plurality of content consumers that are physically proximate to the computing device, wherein the biometric data includes facial recognition data and/or voice recognition data for the plurality of content consumers; compare the obtained biometric data with stored biometric data; and identify, based on the comparison, the plurality of content consumers that are physically proximate to the apparatus based on stored biometric data.

19. The apparatus of claim 17, wherein determine a plurality of access permissions comprises determine access permissions associated with metadata describing the piece of content.

20. The apparatus of claim 19, wherein the metadata describing the piece of content describes one or more age ranges that are permitted to consume the content.

21. The apparatus of claim 17, wherein the access control module is further to operate on the one or more computing processors to:

receive an override command after denial of access to the piece of content; and allow access collectively to the piece of content based on the received override command.

22. A computer-implemented method, comprising:

receiving, by a computing device, a request for presentation of content, the content including at least one of video, audio, or closed captioning;

determining, by the computing device, a plurality of access permissions for a plurality of content consumers controlling, by the computing device, access to the content collectively, based on the determined plurality of access permissions of a plurality of content consumers physically proximate to the computing device;

determining, by the computing device, whether to present the content based on a result of the determined permissions of the plurality of content consumers physically proximate to the computing device after a content consumer is no longer physically proximate to the computing device or has become proximate to the computing device; and present the content on determination that the plurality of content consumers physically proximate to the computing device all have access permissions compatible with content wherein to determine permissions of the plurality of content consumers further includes:

providing one or more words and/or numbers for one of the plurality of content consumers to read aloud;

capturing audio of the one of the plurality of content consumers reading the one or more words and/or numbers; and authenticating the one of the plurality of content consumers by performing voice recognition on the captured audio.

23. The method of claim 22, further comprising obtaining biometric data, by the computing device, from a plurality of content consumers that are physically proximate to the computing device, wherein biometric data includes facial recognition data and/or voice recognition data; comparing, by the computing device, the obtained biometric data with stored biometric data; and identifying, by the computing device, and based on the request and based on the comparison, the plurality of content consumers that are physically proximate to an apparatus.

24. The method of claim 22, wherein determining a plurality of access permissions comprises determining access permissions associated with metadata describing the piece of content.

25. The method of claim 24, wherein the metadata describing the content describes one or more age ranges that are permitted to consume the content.

* * * * *